C. H. McCormick.

Harvester Cutter.

No 977

Reissued Jun. 5, 1860.

UNITED STATES PATENT OFFICE.

C. H. McCORMICK, OF CHICAGO, ILLINOIS.

IMPROVEMENT IN MACHINES FOR CUTTING GRASS, &c.

Specification forming part of Letters Patent No. 21,573, dated September 21, 1858; Reissue No. 977, dated June 5, 1860.

DIVISION C.

*To all whom it may concern:*

Be it known that I, CYRUS H. McCORMICK, of Chicago, in the county of Cook and State of Illinois, have invented certain new and useful Improvements in the Cutting Apparatus of Machines for Cutting Grass and Grain, of which the following is a full, clear, and exact description, reference being had to the accompanying drawings, which make part of this specification.

Figure 1:
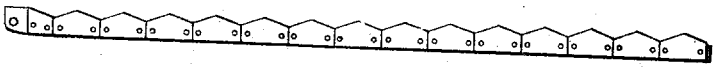
Figure 2:
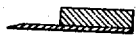

Vibrating scalloped cutters for mowing-machines are usually made by riveting thin blades of refined steel to a strong bar of either iron or steel. This bar is commonly called the "cutter-bar." Such a cutter is represented in plan in Figure 1 and in section upon an enlarged scale in Fig. 2 of the drawings, in which figures the blade is shown extending to the back of the bar. This cutter is objectionable because it requires for its construction too much material, and especially too much blade-steel, any surplus of material involving not only the loss of its first cost, but, what is of far more consequence, a constant loss of power in giving to it a rapid vibrating motion. The blade of steel is only required to overlap the bar a sufficient distance to allow of its being firmly secured thereto by rivets. I have found the overlapping of the blade over one-half of the width of the bar to be sufficient, and I accordingly make the blade of my scalloped cutter of a strip of plate-steel narrower by one-half of the width of the cutter-bar than would be required for making such a cutter as is represented in Figs. 1 and 2.

Figure 3:
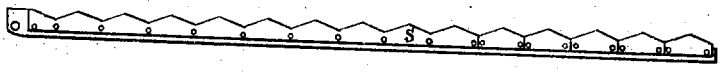
Figure 4:
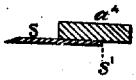
Figure 5:
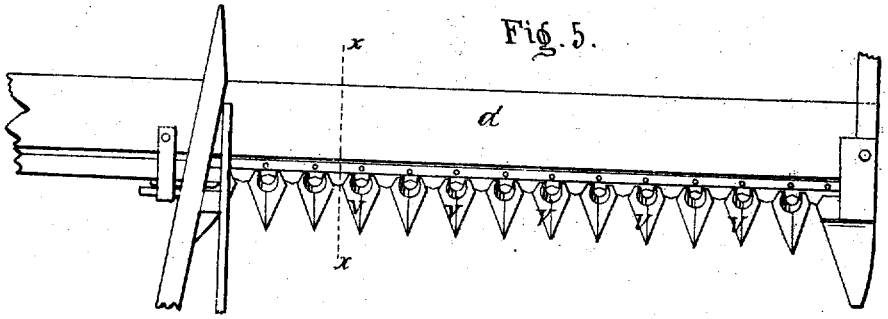
Figure 6:
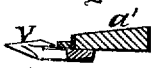

Fig. 3 represents my improved cutter in plan, and Fig. 4 represents it in section, the section being on an enlarged scale, $a^4$ in these figures denoting the cutter-bar, and $s$ the blade, which is riveted to the cutter-bar. Fig. 5 represents my improved cutter applied to a McCormick finger-beam and fingers, and Fig. 6 represents a transverse section of the same at the line $x\ x$ of Fig. 5, $a'$ in these figures denoting the finger-beam, and V the slotted guard-fingers through which the cutter plays.

The side of the bar $a^4$ of the cutter, in rear of the back edge, $s'$, of the blade, slides upon the front margin of the top of the finger-beam and the back edge, $s'$, of the blade slides against the front side of the finger-beam. Thus the groove or rabbet formed by the removal of the surplus steel from the back of the blade is utilized by making it perform the duty of slide and guide of the cutter.

What I claim under this patent as my invention is—

In the combined blade and bar of a scalloped vibrating cutter, making the bar extend behind the blade, substantially as described, for the purposes specified.

In testimony whereof I have hereunto subscribed my name.

C. H. McCORMICK.

Witnesses:
C. D. WOLF,
BRADFORD SLOAT.